United States Patent
Lee

(10) Patent No.: US 7,474,356 B2
(45) Date of Patent: Jan. 6, 2009

(54) DISPLAY SYSTEM AND METHOD OF ELIMINATING RESIDUAL IMAGE IN THE SAME

(75) Inventor: Jin Seok Lee, Naju-si (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 10/446,858

(22) Filed: May 29, 2003

(65) Prior Publication Data

US 2004/0051705 A1 Mar. 18, 2004

(30) Foreign Application Priority Data

Sep. 17, 2002 (KR) ............ 10-2002-0056573

(51) Int. Cl.
*H04N 5/445* (2006.01)
(52) U.S. Cl. ............ 348/569; 348/563; 348/565; 348/607
(58) Field of Classification Search ............ 348/565, 348/569, 564, 173, 607, 377–382, 634; 345/545, 345/87; *H04N 5/445*
See application file for complete search history.

(56) References Cited

U.S. PATENT DOCUMENTS

| | | | | |
|---|---|---|---|---|
| 6,226,040 B1 * | 5/2001 | Kuo et al. | ............ | 348/446 |
| 6,462,746 B1 * | 10/2002 | Min et al. | ............ | 345/545 |
| 6,556,252 B1 * | 4/2003 | Kim | ............ | 348/565 |
| 6,628,247 B2 * | 9/2003 | Toffolo et al. | ............ | 345/31 |
| 6,678,009 B2 * | 1/2004 | Kahn | ............ | 348/569 |
| 6,697,124 B2 * | 2/2004 | Dimitrova et al. | ............ | 348/565 |
| 6,806,888 B2 * | 10/2004 | Bhogal et al. | ............ | 345/660 |
| 6,891,564 B2 * | 5/2005 | Fujimori et al. | ............ | 348/173 |
| 7,102,694 B2 * | 9/2006 | Jang | ............ | 348/607 |
| 2001/0004252 A1 | 6/2001 | Park et al. | | |
| 2001/0011979 A1 | 8/2001 | Hasegawa et al. | | |
| 2002/0075407 A1 * | 6/2002 | Cohen-Solal | ............ | 348/565 |
| 2002/0105490 A1 | 8/2002 | Kanbe et al. | | |
| 2003/0076332 A1 * | 4/2003 | Choi | ............ | 345/581 |
| 2004/0075770 A1 * | 4/2004 | Lee | ............ | 348/565 |
| 2004/0165064 A1 * | 8/2004 | Weitbruch et al. | ............ | 348/173 |

FOREIGN PATENT DOCUMENTS

| | | |
|---|---|---|
| EP | 1271459 | 1/2003 |
| WO | WO 01/06797 A1 | 1/2001 |

OTHER PUBLICATIONS

Netherlands Office Action dated Jun. 16, 2006.

* cited by examiner

*Primary Examiner*—Trang U Tran
(74) *Attorney, Agent, or Firm*—Ked & Associates, LLP

(57) ABSTRACT

A display system and a method of eliminating a residual image on a display causes an on screen display (OSD) block to be moved to different locations on the display to eliminate the residual image. In a method embodying the invention, a mixed video image that includes a video image from a video source and at least one OSD block is generated. Thereafter, the mixed video image is displayed on a display screen to thereby eliminate a residual image on the display screen and the at least one OSD block is scanned to different positions on an active image portion of the display screen. In a progressive scanning mode, the OSD block is progressively scanned across the active image portion. On the other hand, in a random scanning mode the at least one OSD block is randomly moved to different locations on the active image portion of the display screen for a predetermined period of time.

26 Claims, 5 Drawing Sheets

DISPLAY SYSTEM AND METHOD OF ELIMINATING RESIDUAL IMAGE IN THE SAME

BACKGROUND OF THE INVENTION

This application claims the benefit of Korean Application No. P2002-56573, filed on Sep. 17, 2002, which is hereby incorporated by reference as if fully set forth herein.

1. Field of the Invention

The present invention relates to a display device, and more particularly, to a display system and a method of eliminating a residual image in the display system.

2. Background of the Related Art

A display device is an apparatus that receives video/audio signals from a video/audio source and performs the required processes so as to display pictures on a display screen and output sound through a speaker. Some of the typical display devices are Cathode Ray Tube (CRT) monitors, Liquid Crystal Displays (LCD) and Plasma Display Panels (PDP). Among the various display devices mentioned above, the PDPs and LCDs attract greater attention to many users because of their superior dimensional and display properties. For example, the overall thickness of a typical PDP or LCD device is much less than an ordinary CRT television.

However, when an image that includes a character or a drawing is displayed on a display screen of the PDP or LCD device for a long period of time, the image of the character or drawing remains on the display screen for a short period of time even after the image is erased (e.g., power off). This will cause an uneven display usually known as a residual image or an afterimage. The residual image is one of the typical disadvantageous characteristics of the LCD and PDP devices that deteriorate image quality of the image display devices. Also, when one or more pixels of an LCD or PDP device represent a same color for a long period of time, the pixels may be greatly damaged.

For the reasons described above, it is highly desirable to provide a display system that is able to eliminate a residual image from a display screen and a method of eliminating such residual image without obstructing a user's view of the display screen.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a display system and a method of eliminating a residual image in the display system that substantially obviates one or more problems due to limitations and disadvantages of the related art.

An object of the present invention is to provide a display system that eliminates a residual image by scanning at least one on-screen-display (OSD) block across an active image portion of a display screen.

A further object of the present invention is to provide a method of eliminating a residual image in a display system without obstructing a user's view of a display screen and without adding an additional component to the existing display system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of eliminating a residual image in a display system according to the present invention includes generating a mixed video image that includes a video image from a video source and at least one on-screen-display (OSD) block. The mixed video image is then displayed on a display screen to thereby eliminate a residual image on the display screen. The method may further include moving the at least one OSD block to different positions on an active image portion of the display screen to eliminate residual images from different positions on the display screen.

There are two distinct ways of moving the at least one OSD block to different locations on the active image portion. One is to scan the OSD block progressively across the active image portion (progressive scanning mode), and the other is to randomly move the OSD block to different locations on the active image portion (random scanning mode). In the progressive scanning mode, the moving step is achieved by moving the OSD block horizontally to a plurality of different positions across the active image portion of the display screen, moving the OSD block vertically when no portion of the OSD block remains within the active image portion of the display screen, and repeating these two steps until the OSD block has been scanned across the entire active image portion of the display screen. On the other hand, in the random scanning mode the OSD block is randomly moved to different locations on the active image portion of the display screen for a predetermined period of time, which can be determined based on at least one of a pixel refresh period, a size of the OSD block, a number of the at least one OSD block, and a size of the active image portion of the display screen.

In another aspect of the present invention, a display system according to the present invention comprises means for generating a mixed video image that includes a video image from a video source and at least one on-screen-display (OSD) block. The display system may also include means for displaying the mixed video image on a display screen to thereby eliminate a residual image on the display screen.

In a further aspect of the present invention, a display system according to the present invention comprises an on-screen-display (OSD) controller configured to generate an OSD video signal that includes at least one OSD block capable of eliminating a residual image, a mixer for mixing a video signal and the OSD video signal to generate a mixed video signal, and a display coupled to the mixer and configured to display the mixed video image. The OSD controller is configured to cause the OSD block to move to different locations on an active image portion of the display to thereby remove a residual image from different positions on the active image portion of the display.

The OSD controller of the display system may move the at least one OSD block in two distinct modes. Namely, it may progressively scan the OSD block across the active image portion of the display system (progressive scanning mode) or randomly move the OSD block to different locations on the active image portion of the display screen (random scanning mode).

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to preferred embodiments of the present invention, examples of which are illustrated in the accompanying drawings. Wherever possible, the same reference numbers will be used throughout the drawings to refer to the same or like parts.

Figure 1:
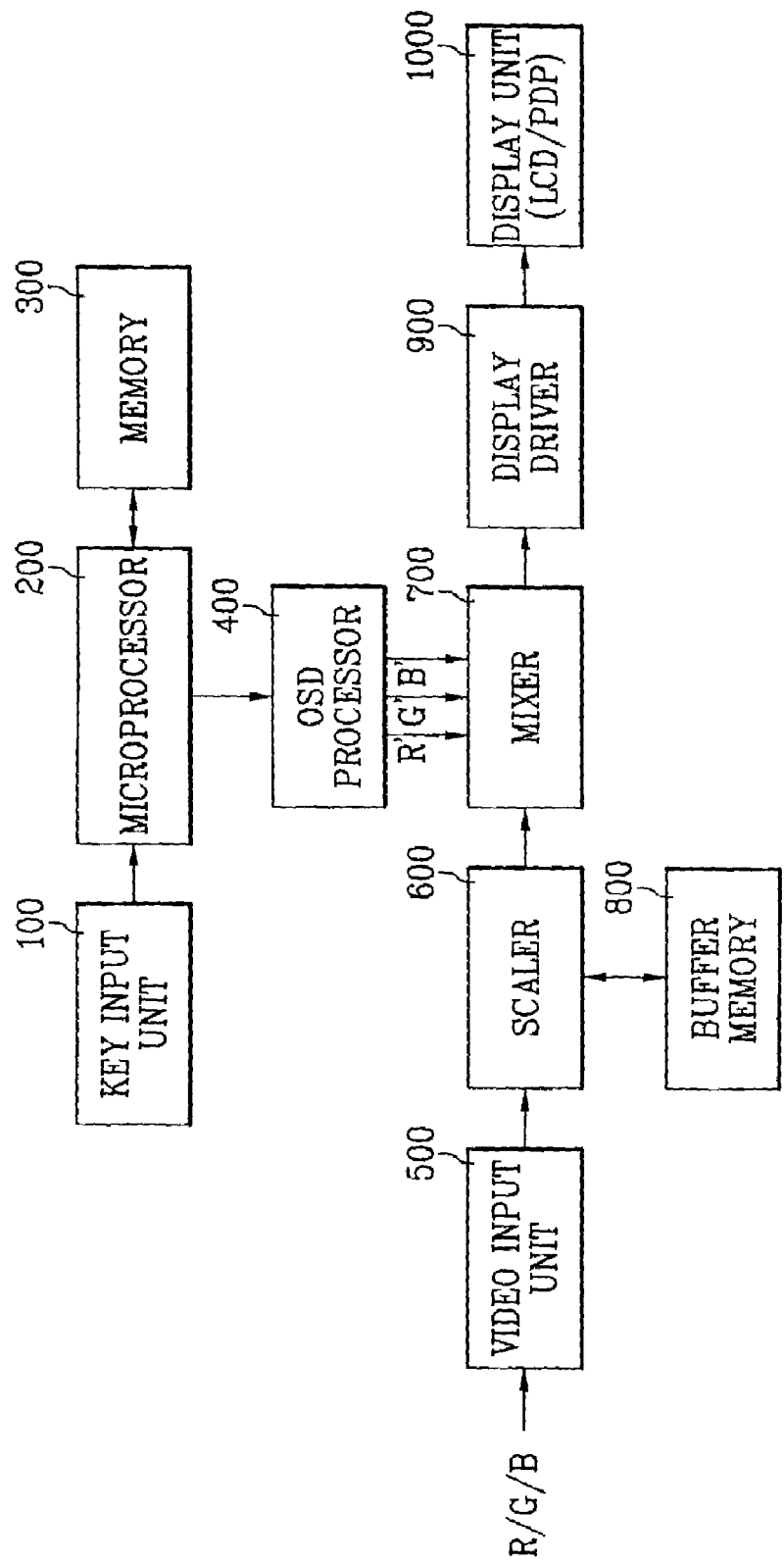
FIG. 1 illustrates a display system that eliminates a residual image according to the present invention.

FIG. 1 illustrates a display system that is able to eliminate a residual image according to the present invention. Referring to FIG. 1, the display system comprises a key input unit 100 for receiving commands from a user, a microprocessor 200 that generates a control signal for displaying a video signal according to the inputted vertical sync (V-Sync), horizontal sync (H-Sync) and clock signals and further generates on-screen-display (OSD) data for eliminating a residual image, and an OSD processor 400 that converts the OSD data into displayable R, G, and B signals including at least one white OSD block.

The display system further comprises a memory 300 that stores the OSD data and data for controlling various components of the display system, a video input unit 500 that receives analog or digital R, G, and B signals and converts them into digital R, G, and B signals, a buffer memory 800 that stores the converted digital R, G, and B signals in a frame unit, a scaler 600 that outputs the stored R, G and B signals according to signal input timing of the display unit 1000, a mixer 700 that combines the output of the scaler 600 with the displayable R, G and G signals outputted from the OSD processor 400, and a display driver 900 that receives the combined signals and drives the display unit 1000 for displaying the combined signals. The display unit 1000 may be a LCD screen, a plasma display panel (PDP) or some other type of display that suffers from the residual image problem When a user turns a residual image elimination function on through the key input unit 100, the microprocessor 200 automatically generates OSD data. Thereafter, the OSD processor 400 converts the OSD data into displayable video signals (R', G' and B'), as shown in FIG. 1, according to input H-sync and V-sync signals. In addition, the digital R, G and B signals outputted from the video input unit 500 are inputted to the scaler 600 and stored in the buffer memory 800 in a frame unit. Then the scaler 600 outputs the signals stored in the buffer memory 800 according to signal input timing of the display unit 1000. The mixer 700 combines the signals outputted from the scaler 600 with the displayable OSD video signals, which are processed in the OSD processor 400, according to a control signal of the microprocessor 200. Next, the display driver 900 receives the combined video signals and drives the display unit 1000 so as to display the combined video signals.

In preferred embodiments of the invention, the on screen display image generated through the microprocessor 200 and the OSD processor 400 comprise a white block which can have varying shapes. When a white block is displayed on a portion of the display screen, the white block will eliminate any residual image that was previously appearing in the portion of the display. By moving the OSD block around to different portions of the display screen, residual images can be removed from the various portions of the display screen. Also, provided the OSD block does not remain at any single location on the display screen for an extended period of time, the user is not likely to even notice the appearance of the OSD block.

In preferred embodiments of the invention, the size of the OSD block and the rate at which the OSD block is moved around the display screen will be controlled to minimize a user's ability to notice the existence of the OSD block. Also, if the OSD block is moved randomly to different portions of the screen, the user may be less likely to notice the appearance of the OSD block.

In some embodiments of the invention, a plurality of OSD blocks may appear on the display screen at any given moment of time. When multiple OSD blocks are used, each of the OSD blocks can be randomly moved, or the OSD blocks can be progressively scanned against different portions of the display screen to minimize the amount of time required to eliminate the residual image from the entire display.

Figure 2:
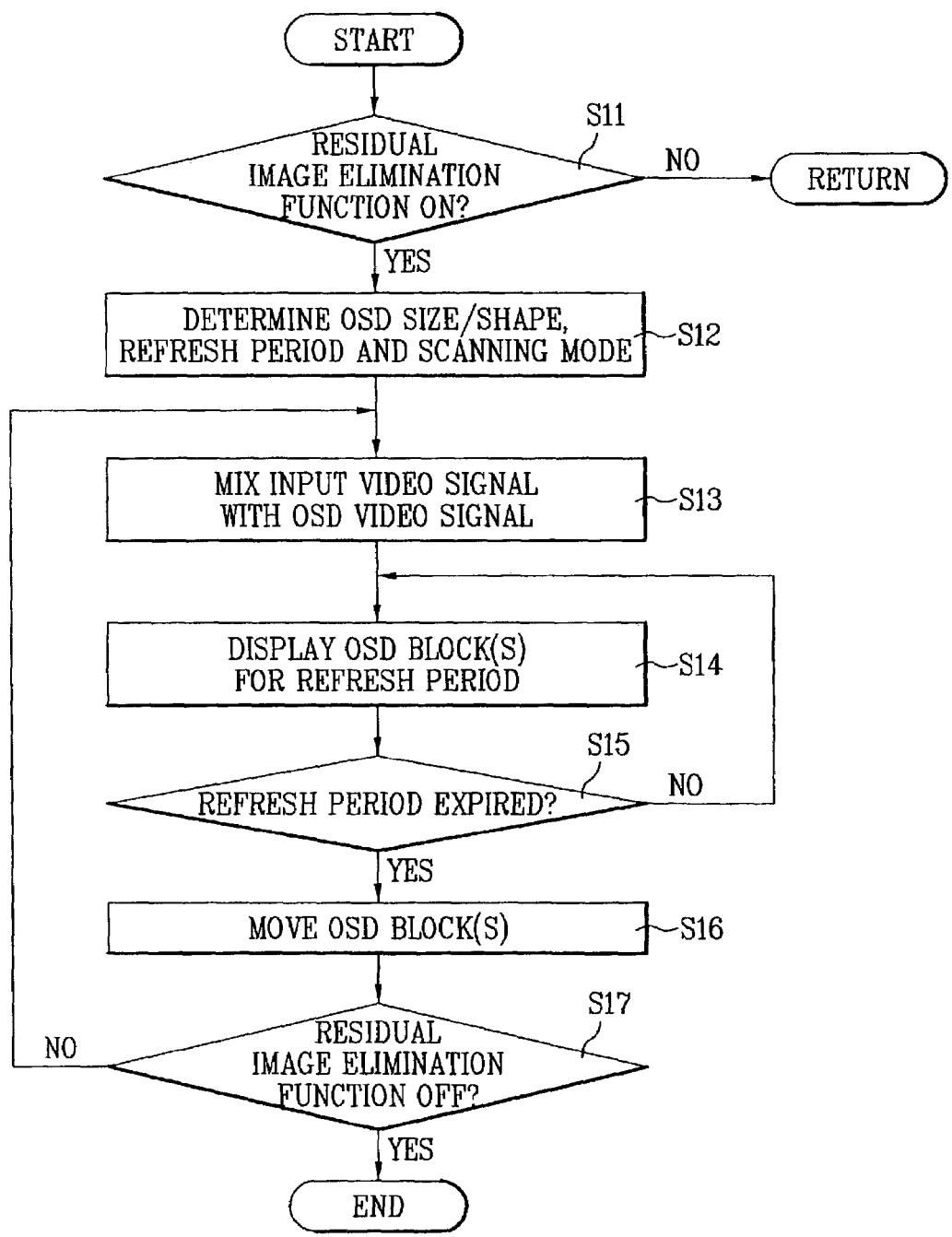
FIG. 2 illustrates a method of eliminating a residual image of a display system according to the present invention.

FIG. 2 illustrates a method of eliminating a residual image for a display system according to the present invention. First of all, the microprocessor 200 of the display system shown in FIG. 1 initially determines whether a user has turned the residual-image elimination function on (S11). If the user has, the microprocessor 200 determines a plurality of parameters which include the number of white OSD blocks, the shape and size of each OSD block, a pixel refresh period, and a scanning mode (S12). These values can be selected from the default values stored in the memory 300 or can be manually selected by the user. The scanning mode is any one of progressive scanning, random scanning and multiple OSD scanning modes. After all the required parameters are determined in step S12, the mixer 700 combines an input video signal with an OSD video signal. The OSD video signal is generated by the OSD processor 400 based on the parameters determined in step S12 (S13). Thereafter, at least one white OSD block is displayed at a first position on the display for a determined pixel fresh period (S14-S15). The OSD block is then moved to a second position on the active image portion of the display screen according to the selected scanning mode after the pixel refresh period is expired (S16). Next, the microprocessor 200 determines whether the user has turned the residual-image elimination function off (S17). It the user has not, steps S13 to S17 are repeated.

Figure 3:
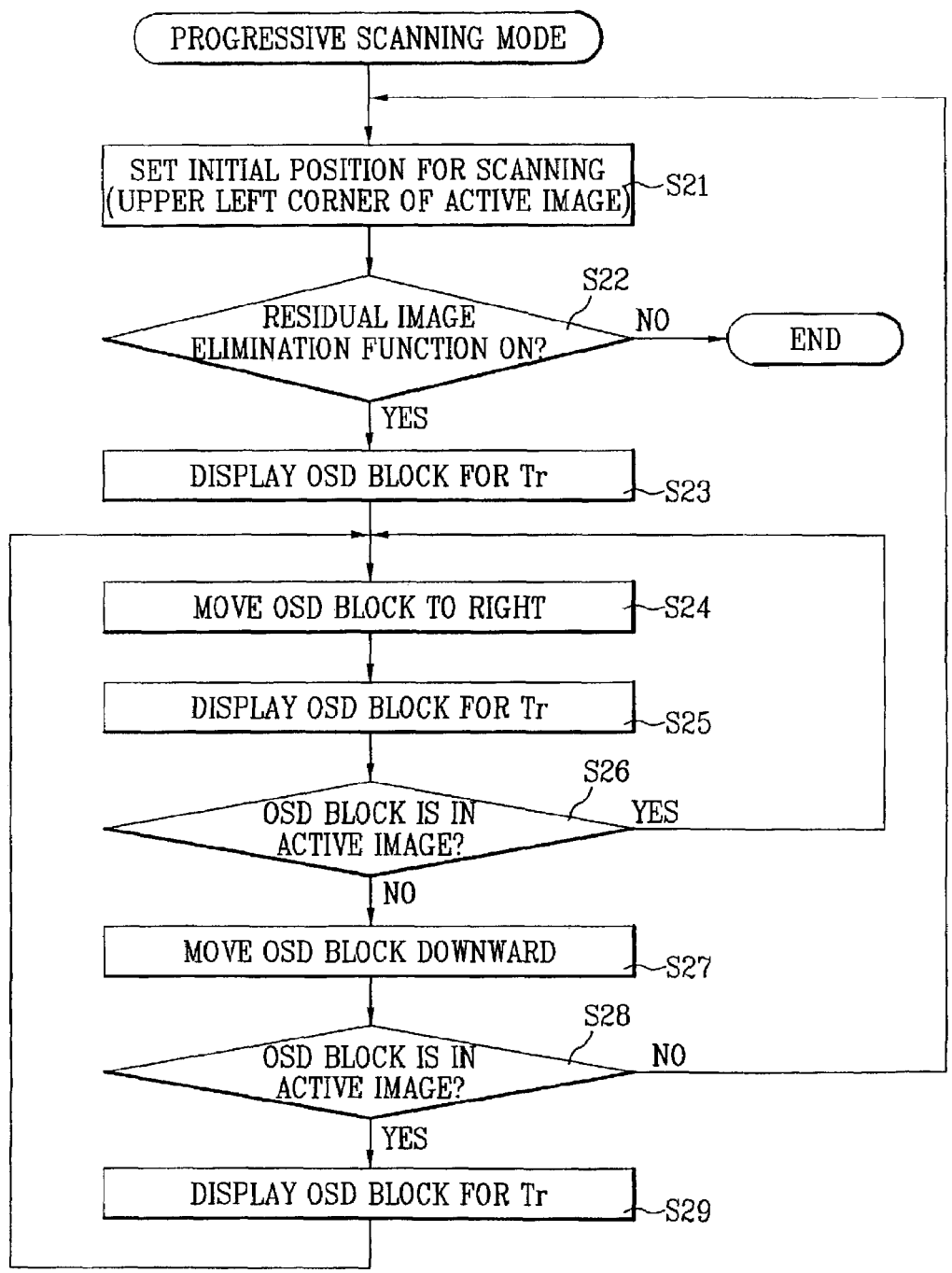
FIG. 3 illustrates a method of eliminating a residual image in a progressive scanning mode for a display system according to the present invention.

FIG. 3 illustrates another method of eliminating a residual image for a display system in a progressive scanning mode according to the present invention. Referring to FIG. 3, the microprocessor 200 initially determines an initial scanning position of a white OSD block, which is typically the beginning point (left-hand) of the topmost line of an active image portion of a display screen (S21). Next, it further determines whether a user has turned the residual image elimination function on (S22). If the user has, the microprocessor 200 displays a white OSD block at the initial position for a predetermined pixel refresh period Tr (S23). Next, it moves the OSD block to the right (S24). For example, if the previous position of a 2-by-2 OSD block relative to a reference point, which is the beginning pixel of the topmost line of the active image is (1,1), (2,1), (1,2) and (2,2), the OSD block moves to a new position of (3,1), (4,1), (3,2) and (4,2) in step S24. After the OSD block has been properly moved in step S24, the microprocessor 200 displays the OSD block at the new position for Tr (S25).

Thereafter, the microprocessor 200 determines whether the entire OSD block displayed in step S25 is within the active image (S26). If it is, steps S24 to S26 are repeated. Otherwise the microprocessor 200 moves the OSD block downward, and back to the beginning of a scan line (S27). For example, if the four corners of the active image portion of the display screen are (1,1), (800,1), (1,600) and (800,600) and the position of the 2-by-2 OSD block displayed in step S25 is (801,1), (802, 1), (801,2) and (802,2), the next position of the OSD block becomes (1,3), (2,3), (1,4) and (2,4) in step S27. After the OSD block is properly moved downward in step S27 as described above, the microprocessor further determines whether the OSD block moved in step S27 is within the active image portion (S28). If it is, microprocessor 200 displays the OSD block at the new potion for Tr (S29) and steps S24 to S28 are repeated until the entire active image portion is scanned by the OSD bock. On the other hand, if it is determined in step S28 that the new position of the OSD block is not within the active image portion, the method returns to step S21.

Figure 4:
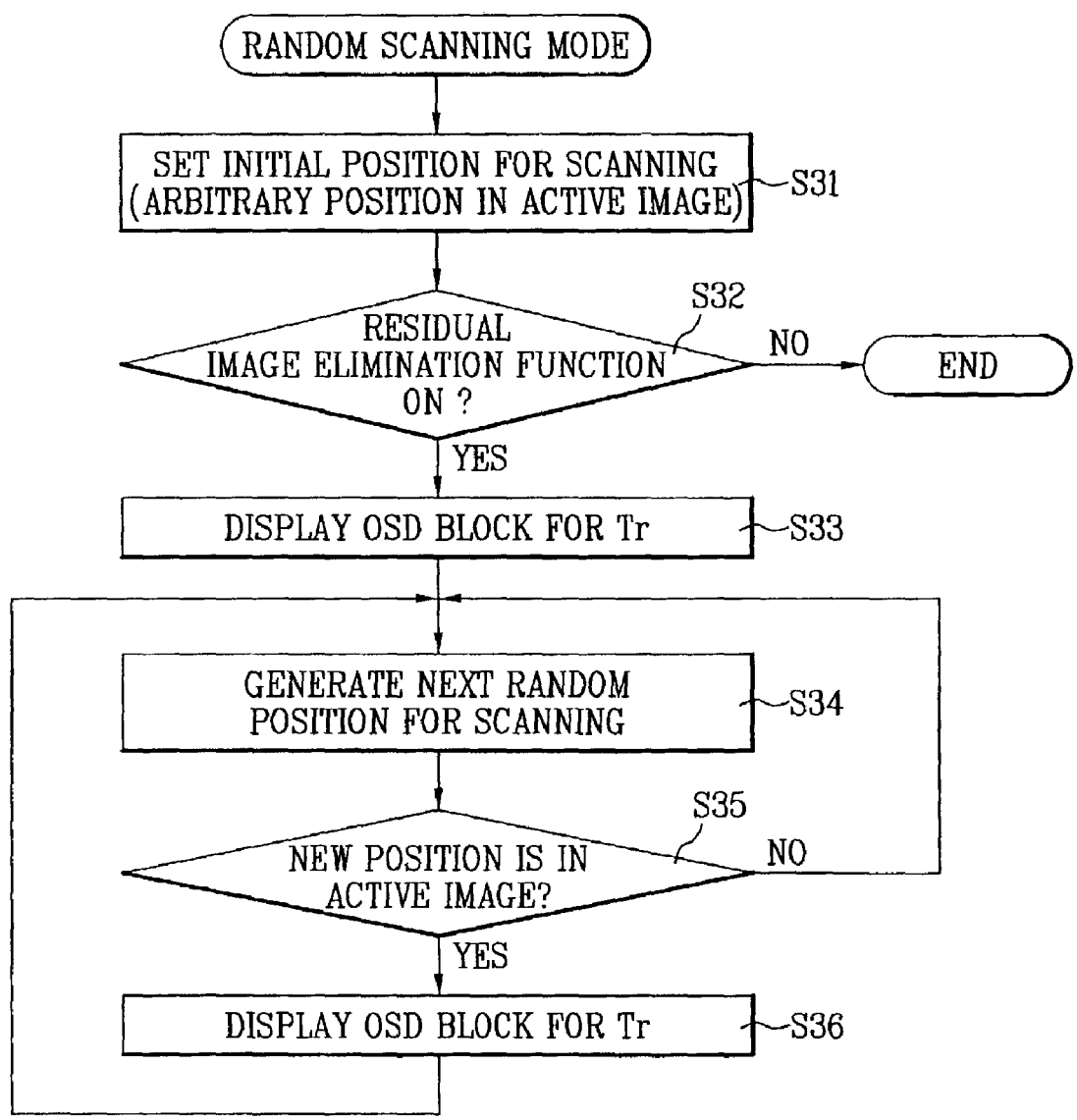
FIG. 4 illustrates a method of eliminating a residual image in a random scanning mode for a display system according to the present invention.

FIG. 4 illustrates another method of eliminating a residual image in a random scanning mode according to the present invention. Referring to FIG. 4, the microprocessor 200 initially sets an initial scanning position of a white OSD block by selecting an arbitrary position in an active image portion of a display screen (S31). If it is determined in step S32 that a residual-image elimination function has been turned on by a user, the microprocessor 200 displays the white OSD block for a predetermined refresh period Tr at the initial scanning position (S33). Thereafter, it generates a next random position of the OSD block for scanning (S34) and determines whether the newly generated position of the OSD block is within the active image portion (S35). If it is, the microprocessor 200 displays the OSD block for Tr at the new position (S36) and repeats steps S34 to S35 again until a predetermined frame refresh period is expired or until the entire active image portion of the display screen has been refreshed. On the other hand, if it is determined in step S35 that the newly generated position is outside of the active image, the microprocessor 200 repeats steps S34 and S35 without displaying the OSD block at the new position.

Figure 5:
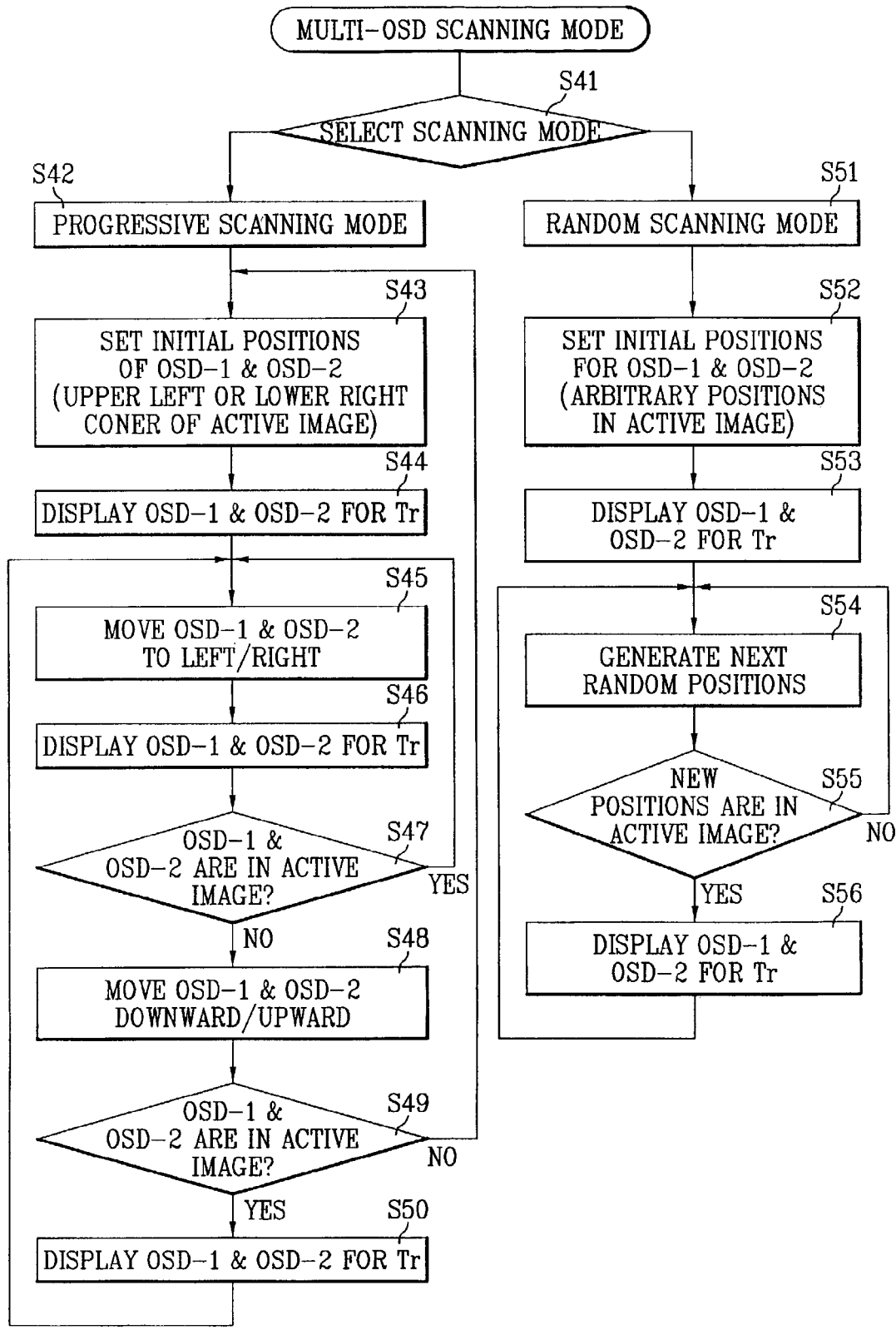
FIG. 5 illustrates a method of eliminating a residual image in a multi-OSD scanning mode for a display system according to the present invention.

FIG. 5 illustrates yet another method of eliminating a residual image for a display system in a multi-OSD scanning mode according to the present invention. In this mode, two or more OSD blocks are used simultaneously to eliminate residual images. In the multi-OSD scanning mode, the microprocessor 200 shown in FIG. 2 initially selects one of a progressive scanning mode or a random scanning mode (S41). If the progressive scanning mode is selected (S42), the microprocessor 200 sets initial positions of a first white OSD block (hereinafter, "OSD-1") and a second white OSD block (hereinafter, "OSD-2") (S43). For example, the initial positions of OSD-1 and OSD-2 may be set to the upper left and lower right corners of an active image portion of a display screen, respectively. Then the microprocessor 200 displays OSD-1 and OSD-2 at the respective initial positions for a predetermined pixel refresh period Tr (S44). Next, it moves OSD-1 and OSD-2 to their next horizontal positions (S45) and displays OSD-1 and OSD-2 at the respective new positions for Tr (S46). In one embodiment, OSD-1 will be moved to the right and OSD-2 will be moved to the left. This basically means that OSD-1 will be moved in a typical progressive scan direction, while OSD-2 is moved in a reverse progressive scan direction.

Thereafter, the microprocessor 200 determines whether OSD-1 and OSD-2 displayed in step S46 are within the active image (S47). If they are, steps S45 to S47 are repeated again. Otherwise, the microprocessor 200 moves OSD-1 and OSD-2 downward or upward (S48) and determines whether the vertically moved OSD-1 and OSD-2 are within the active image (S49). In a preferred embodiment, OSD-1 would be moved downward, and OSD-2 would be moved upward, which would continue the forward progressive scan of OSD-1 and the reverse progressive scan of ODS-2. If OSD-1 and OSD-2 are still in the active image, the microprocessor 200 displays OSD-1 and OSD-2 at the new positions for Tr (S50) and repeats steps S45 to S49 until both OSD blocks scan across the entire active image portion.

Now referring back to step S41 shown FIG. 5, if the random scanning mode is selected in step S41, the microprocessor 200 sets initial scanning positions of OSD-1 and OSD-2 by selecting arbitrary positions in an active image portion of a display screen (S52) and displays OSD-1 and OSD-2 at the respective initial positions for Tr (S53). Next, it generates next random positions of OSD-1 and OSD-2 (S54) and determines whether the newly generated positions of OSD-1 and OSD-2 are within the active image (S55). If they are, the microprocessor 200 displays OSD-1 and OSD-2 for Tr at the new positions (S56) and repeats steps S54 to S55 until a frame refresh period is expired or until the entire active image portion is refreshed. Otherwise, step S56 is skipped and steps S54 and S55 are repeated again.

In the multi-OSD scanning mode, a plurality of OSD blocks are simultaneously scanned across the active image portion of the display. In the embodiment described above, two OSD blocks are used. However, other embodiments of the invention could utilize three or more OSD blocks simultaneously.

The multi-OSD mode should allow the display to remove all residual images faster than methods which utilize only a single OSD block.

Also, in the multi-OSD progressive scanning mode described above, one OSD block is moved in a forward progressive scan, and the second OSD block is moved in a reverse progressive scan. In other embodiments of the invention, one OSD block could be moved in a forward scan throughout the top half of the display screen, while the second OSD block is moved in a forward progressive scan covering the lower portion of the display screen. In still other embodiments of the invention, different progressive scanning methods could be used to scan three or more OSD blocks across different portions of the active display portion.

In the methods of the present invention described above in detail, the number of the scanning OSD blocks and the size and shape of each OSD block can be set to the default values initially stored in the memory 300 shown in FIG. 1 or can be manually selected by a user through the key input unit 100. An example of an OSD block is a 2-by-2 matrix of pixels. In addition, a pixel refresh period (Tr) representing a total period of time that it takes to refresh a single pixel and a frame refresh period representing a total period of time that it takes to refresh all the pixels of an entire active image portion can be also selected by the user.

Once an OSD block scanning mode is selected, the initial positions of one or more OSD blocks are determined based on the selected scanning mode. Thereafter, when the subsequently determined positions of the OSD blocks are outside of the active image portion, the positions of the blocks are newly determined so that they can be displayed within the active image portion. In addition, when the microprocessor 200 shown in FIG. 1 determines that all the pixels of the active image are refreshed during the frame refresh period, then it relocates the OSD blocks to their initial positions for scanning and starts scanning the OSD blocks throughout the active image portion.

Reference will now be made to a few examples which will provide a further understanding of the present invention. When an OSD block in a matrix form of 3-by-3 pixels is progressively scanned on an active image portion of 852-by-480 pixels with a pixel refresh period of 16.6 milliseconds (operation frequency of 60 Hz for a display panel), it will take about 12 minutes to refresh all the pixels of the active image. Thereafter, when the OSD block is scanned on the active image portion in an identical manner, the time it takes to rescan a particular pixel of the active image will be also about 12 minutes. Considering the fact that a residual image usually occurs when a cell (pixel) is discharged to represent a same color for more than 30 minutes, refreshing each pixel of the active image for every 12 minutes will effectively eliminate such residual image occurrence.

In another example, where an OSD block in a matrix form of 1-by-852 pixels is scanned through the active image portion of 852-by-480 pixels with a pixel refresh period of 16.6 milliseconds, it takes about 8 seconds to refresh all the pixels of the active image portion. Therefore, the scanning speed of the OSD block is greatly limited by the operation frequency of the display panel, and the pixel refresh period increases as the scanning speed of the OSD block decreases.

When the size of an OSD block is large, the user's view of a display screen may be obstructed due to such large OSD block, especially in a zoom-in mode. In order to solve this disadvantageous limitation, more than one white OSD block can be displayed on an active image portion of a display screen so that the entire active image portion can be effectively refreshed. In other words, when a plurality of small white OSD blocks are scanned through the active image portion of the display screen, a residual image of the active image is effectively eliminated without obstructing the user's view of the display screen.

As described above, the present invention suggests scanning one or more white OSD blocks through an active image portion of a display screen so as to eliminate a residual image of the display screen that displays a video signal. When there is no residual image in the display screen that displays a video image, clear and crisp pictures can be provided. A user may select the number of the OSD scanning blocks, size and/or shape of each OSD block, a pixel refresh period, a frame refresh period, and the scanning mode so as to achieve residual image elimination without obstructing the user's view of the display screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for eliminating a residual image in a display system, comprising:
   generating an on screen display (OSD) video signal that includes at least one OSD block capable of removing a residual image;
   generating a mixed video image that includes a video image from a video source and the at least one OSD block;
   displaying the mixed video image on a display screen; and
   moving the at least one OSD block to different positions within an active image portion of the display screen to thereby remove a residual image that was previously appearing in the active image portion of the display screen, wherein the video image remains visible on the display screen as the at least one OSD block is moved within the active image portion of the display screen.

2. The method of claim 1, wherein the moving comprises progressively scanning the at least one OSD block across the active image portion of the display screen.

3. The method of claim 2, wherein the moving further comprises:
   (a) moving the at least one OSD block horizontally to at least one different position across the display screen;
   (b) moving the at least one OSD block vertically when no portion of the at least one OSD block remains within the active image portion of the display screen; and
   (c) repeating (a) and (b) until the at least one OSD block has been scanned across an entire active image portion of the display screen.

4. The method of claim 1, wherein the at least one OSD block is randomly moved to different positions within the active image portion of the display screen.

5. The method of claim 4, wherein the at least one OSD block is randomly moved to different positions within the active image portions of the display screen until a predetermined period of time expires.

6. The method of claim 5, further comprising determining the predetermined period of time based on at least one of a pixel refresh time period, a size of the at least one OSD block, a number of the at least one OSD block appearing in the mixed video image, and a size of the active image portion.

7. The method of claim 1, wherein the at least one OSD block is displayed in a single position in the active image portion for a pixel refresh time period before the at least one OSD is moved to a new position.

8. The method of claim 1, wherein generating a mixed video image comprises generating a mixed video image that includes the video image from the video source and a plurality of OSD blocks.

9. The method of claim 8, wherein at any given moment, each of the plurality of OSD blocks appear at different positions within the active image portion.

10. The method of claim 1, wherein the at least one OSD block appears as a bright color.

11. The method of claim 10, wherein the at least one OSD block appears in white.

12. The method of claim 1, further comprising determining a size and shape of the at least one OSD block.

13. The method of claim 1, wherein a size of the at least one OSD block is less than a size of the video image.

14. A display system, comprising:
an on screen display (OSD) controller configured to generate an OSD video signal that includes at least one OSD block capable of removing a residual image;
a mixer that mixes a video signal from a video source and the OSD video signal and generates a corresponding mixed video image; and
a display configured to display the mixed video image on a display screen, wherein the OSD controller is configured to cause the at least one OSD block to move to different positions within an active image portion of the display screen to thereby remove a residual image that was previously appearing in the active image portion of the display screen, wherein the video image remains visible on the display screen as the at least one OSD block is moved within the active image portion of the display screen.

15. The system of claim 14, wherein the OSD controller is configured to cause the at least one OSD block to be progressively scanned across the active image portion of the display screen.

16. The system of claim 15, wherein the OSD controller is configured to cause the at least one OSD block to move horizontally to at least one different position across the display screen and to cause the at least one OSD block to move vertically when no portion of the at least one OSD block remains within the active image portion of the display screen, until the at least one OSD block has been scanned across an entire active image portion of the display screen.

17. The system of claim 14, wherein the OSD controller is configured to cause the at least one OSD block to move randomly to different positions within the active image portion of the display screen.

18. The system of claim 17, wherein the OSD controller is configured to cause the at least one OSD block to move randomly to different positions within the active image portion of the display screen until a predetermined period of time elapses.

19. The system of claim 18, wherein the OSD controller is configured to determine a length of the predetermined period of time based on at least one of a pixel refresh time period, a size of the at least one OSD block, a number of the at least one OSD block appearing in the mixed video image, and a size of the active image portion.

20. The system of claim 14, wherein the OSD controller is configured to cause the at least one OSD block to be displayed in a single position in the active image portion for a pixel refresh time period before the at least one OSD block is moved to a new position.

21. The system of claim 14, wherein the OSD controller is configured to generate an OSD video signal that includes a plurality of OSD blocks.

22. The system of claim 21, wherein the OSD controller is configured to cause the plurality of OSD blocks to appear at different positions within the active image portion.

23. The system of claim 14, wherein the OSD controller is configured to cause the at least one OSD block to appear as a bright color.

24. The system of claim 23, wherein the OSD controller is configured to cause the at least one OSD block to appear in white.

25. The system of claim 14, wherein the OSD controller is configured to allow a user to select at least one of a size of the at least one OSD block, a shape of the at least one OSD block, a time period that the at least one OSD block is displayed at a single position within the active image portion, and a time period for causing the at least one OSD block to be scanned through all positions within the active image portion.

26. The method of claim 14, wherein a size of the at least one OSD block is less than a size of the video image.

* * * * *